Figure 1:
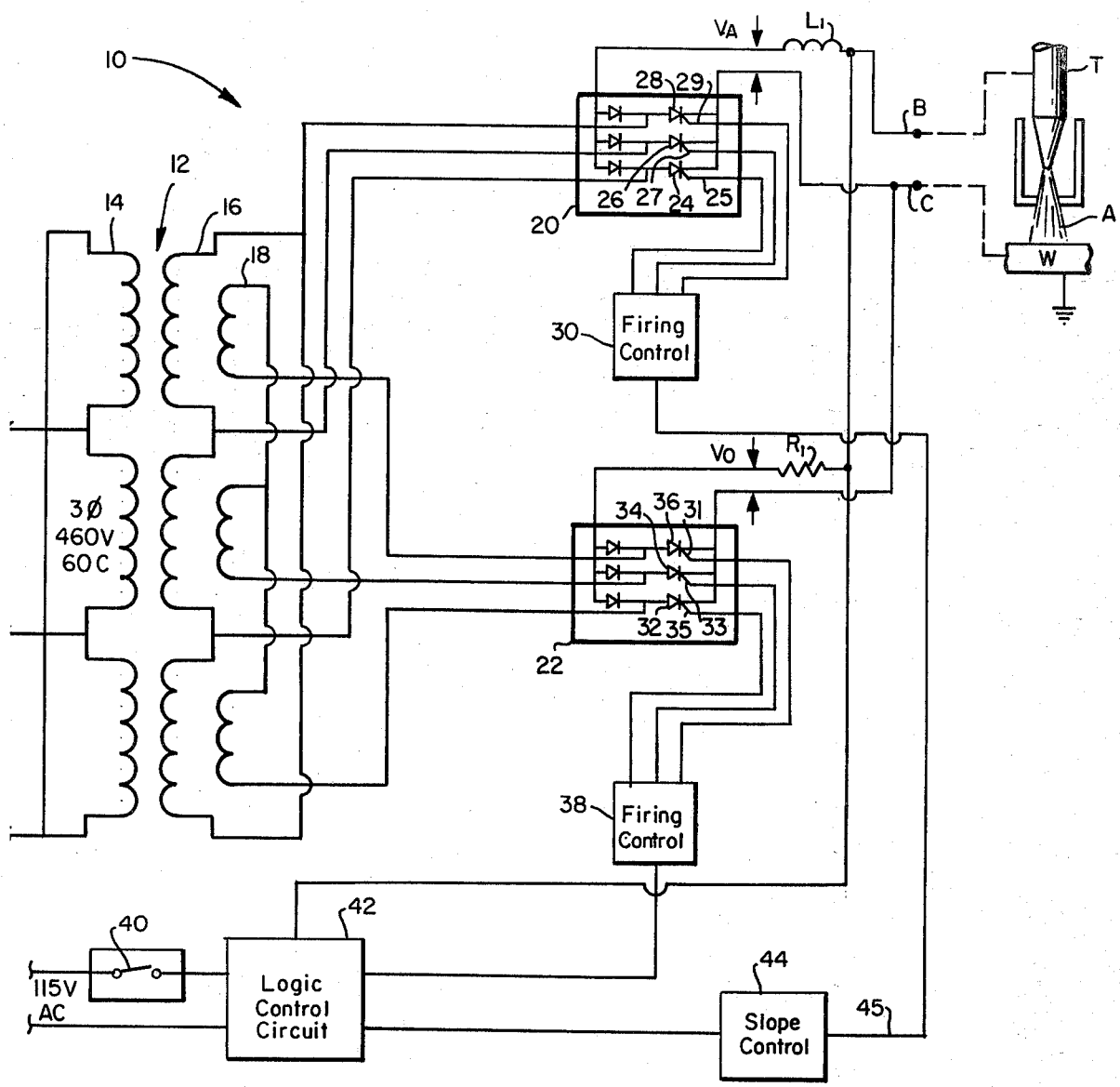

United States Patent [19]

Hardwick et al.

[11] 4,282,569
[45] Aug. 4, 1981

[54] CONSTANT CURRENT WELDING POWER SUPPLY WITH AN UPSLOPE STARTING CURRENT

[75] Inventors: Steven F. Hardwick; Robert C. Fernicola, both of Florence, S.C.

[73] Assignee: Union Carbide Corporation, New York, N.Y.

[21] Appl. No.: 56,966

[22] Filed: Jul. 12, 1979

[51] Int. Cl.³ .................. H02M 7/155; B23K 9/06
[52] U.S. Cl. .................... 363/87; 363/49; 363/129; 219/130.31; 219/130.5
[58] Field of Search ............... 363/49, 68–70, 363/84–88, 128, 129; 219/130.1, 130.21, 130.31, 130.32, 130.33, 130.5

[56] References Cited

U.S. PATENT DOCUMENTS

| Re. 29,441 | 10/1977 | Ericsson | 363/87 X |
|---|---|---|---|
| 3,530,359 | 9/1970 | Grist | 219/130.32 |
| 3,688,180 | 8/1972 | Chiasson et al. | 363/49 X |
| 3,781,640 | 12/1973 | Toth | 363/88 |

*Primary Examiner*—William M. Shoop
*Assistant Examiner*—Peter S. Wong
*Attorney, Agent, or Firm*—Eugene Lieberstein

[57] ABSTRACT

A constant current welding power supply having a single transformer with a primary winding connected to a three phase input source of line voltage and two secondary windings each having a bridge rectifier for providing an open circuit starting voltage separate from the arc working voltage. Each bridge rectifier is fired by separate firing means controlled by a logic control means. One bridge rectifier is energized with an advancing firing angle proportional to a ramp output signal enabled through the control means in response to a predetermined drop in output voltage. The other bridge rectifier is energized in synchronism with the line voltage for a predetermined period of time following the predetermined drop in output voltage.

4 Claims, 2 Drawing Figures 4,282,569

CONSTANT CURRENT WELDING POWER SUPPLY WITH AN UPSLOPE STARTING CURRENT

This invention relates to power supplies and more particularly to a constant current power supply for welding or cutting particularly with a plasma arc torch or a tungsten inert gas (TIG) arc torch.

Constant current welding power supplies require a high open circuit voltage to initiate an arc between the electrode and workpiece. Once the arc is established the arc voltage drops to a substantially lower value. The requirement for a high open circuit voltage has heretofore been satisfied by using a power transformer with substantially more turns than is required to provide the arc voltage after the arc is established. The use of extra windings is electrically inefficient causing a substantial loss of energy which is dissipated as heat throughout the cutting or welding operation. In addition, the extra windings require a power transformer which is larger in size and weight and higher in manufacturing cost than a transformer of smaller capacity with less heat dissipation requirements.

The power supply of the present invention overcomes the disadvantage of prior art power supplies by generating a separate high open circuit voltage for arc ignition independent of the arc working voltage. The open circuit voltage is terminated after a predetermined period of time following arc ignition. A common power transformer having two secondary windings is used to generate both the high open circuit voltage and the arc working voltage independent of one another. The two voltages are rectified through separate SCR bridge rectifier circuits. The SCR rectifier circuit generating the high open circuit voltage is disabled after a predetermined time period following arc ignition. During this period the SCR rectifier circuit generating the arc working voltage is controlled so as to generate a starting current which increases from a first level at a predetermined rate until a predetermined output current level is reached. Thereafter the power supply maintains the output current level constant at the predetermined output level. This latter feature of the power supply provides a "soft start" at the beginning of the welding or cutting operation.

Figure 2:
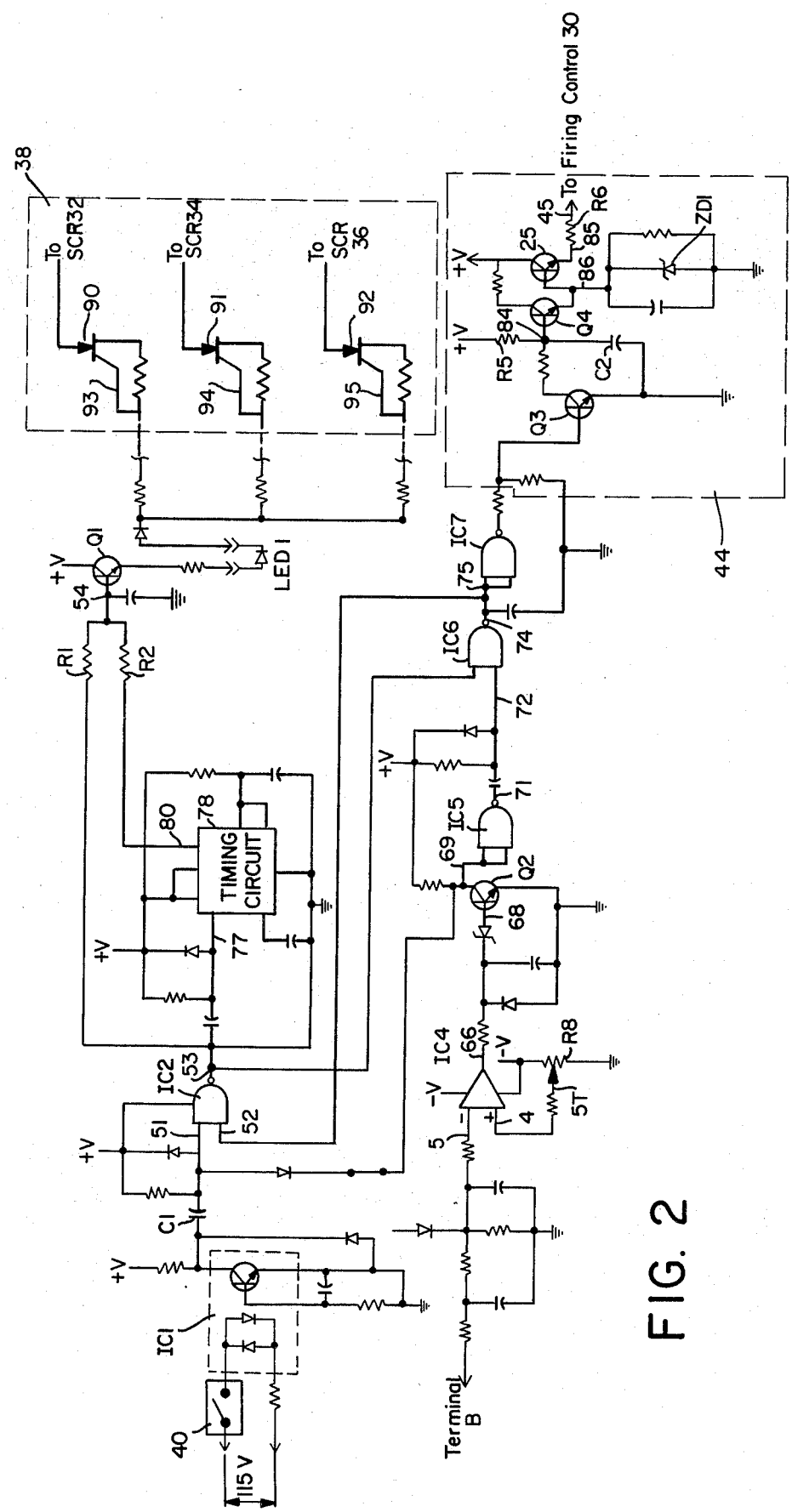

Other advantages of the constant current power supply of the present invention will become apparent from the following detailed description when read in conjunction with the accompanying drawings in which:

FIG. 1 is a modified schematic and block diagram of the constant current power supply of the present invention; and FIG. 2 is a schematic diagram of the control logic circuitry of FIG. 1.

Referring now to FIG. 1 in which the power supply 10 of the present invention is shown comprising a single three phase power transformer 12 having a delta connected primary winding 14 adapted to be connected to a conventional three phase, 460 volt, 60 cycle source of power, a first delta connected secondary winding 16 and a second "Y" connected secondary winding 18. The secondary winding 16 is connected to a conventional full wave three phase bridge rectifier circuit 20 for generating the arc working voltage Va as will be explained hereafter. The full wave bridge rectifier 20 is connected through inductor L1 to the output terminals C and B of the power supply 10. Each leg of the full wave bridge rectifier 20 includes a silicon controlled rectifier (SCR) 24, 26 and 28 respectively. The gate terminals 25, 27 and 29 of the SCR's 24, 26 and 28 are coupled to a main bridge firing control circuit 30.

A second full wave bridge rectifier circuit 22 is connected across the secondary winding 18 for generating a high open circuit voltage Vo of, for example, 400 volts. The second full wave bridge rectifier 22 is connected through resistor R1 to the terminals C and B of the power supply 10 in parallel with the output from the first full wave bridge rectifier circuit 18. The second full wave bridge rectifier 22 includes a silicon controlled rectifier (SCR) 32, 34 and 36 in each leg with the gate terminals 31, 33 and 35 of each SCR connected to a firing control circuit 38.

The power supply output terminals C and B are adapted to be connected to a torch T and workpiece W for generating an arc A between the torch electrode (not shown) and the workpiece W. The high open circuit voltage Vo is energized by actuating the weld contactor (not shown) thus applying 115 volts AC to the logic control circuit 42 which is effectively shown in FIG. 1 as the closure of switch 40. A logic control circuit 42 enables the firing control circuit 38 which in turn energizes the full wave bridge rectifier 22 for generating the open circuit voltage Vo. The resistor R1 limits the current drawn through the secondary winding 18.

The logic control circuit 42 also enables the slope control circuit 44 upon sensing a predetermined decrease in open circuit voltage Vo representing the existence of an arc. The slope control circuit 44 upon being enabled generates an output ramp signal on line 45 which progressively increases to a predetermined level at a given rate. The ramp output on line 45 enables the firing control circuit 30 which in turn energizes the full wave bridge rectifier circuit 20. The control gates 25, 27 and 29 of SCR's 24, 26 and 28 in the full wave bridge rectifier circuit 20 are controllably fired in synchronism with each cycle of impressed AC input such that the firing angle is advanced at a rate proportional to the ramp signal output of the slope control circuit 42 until a predetermined cutting or welding current level is reached. The firing control circuit 38 upon sensing the predetermined decrease in open circuit voltage is disabled after a predetermined period of time thereby turning off SCR's 32, 34 and 36 in the bridge rectifier 22 and removing the open circuit boost voltage Vo.

The logic control circuit 42, firing control circuit 38 and the slope control circuit 44 are schematically shown in detail in FIG. 2. The main bridge firing control circuit 30 is a conventional constant current control for an SCR bridge circuit. A preferred constant current control circuit is shown and described in U.S. Pat. No. 3,781,640 issued Dec. 25, 1973 in the name of T. E. Toth; the disclosure of which is herewith incorporated by reference. The firing current control circuit 30 operates the SCR bridge circuit 20 in response to the ramp signal output from the slope control circuit 44 as explained earlier by advancing the firing angle of the SCR's 24, 26 and 28 in proportion to the increase in the level of the ramp signal 45. This causes the arc current drawn through the secondary winding 16 to increase the arc proportional to the ramp signal. The output of slope control 44 is clamped to a predetermined level corresponding to a preferred operating current level.

In operation, referring particularly to FIG. 2, upon energizing the weld contactor effectively closing switch 40, isolater transistor ICI is turned on applying a negative going pulse through capacitor C1 to pin 51 of nand gate IC2. The output 53 of nand gate IC2 switches from a logical low to a logical high. This high is applied through resistor R1 to the base 54 of transistor Q1 turning it on. Transistor Q1 is coupled through LED 1 to the gate terminals 93, 94 and 95 of the SCR's 90, 91 and 92 of firing control logic 38. SCR's 90, 91 and 92 are coupled to SCR gates 31, 33 and 35 in the bridge rectifier 22. When transistor Q1 turns on, the SCR's 32, 34 and 36 are enabled and an open circuit voltage Vo of, for example, 400 volts is impressed across the output terminals B and C of the power supply.

The logic control 42 includes arc voltage sensing means comprising an operational amplifier IC4 arranged as a comparator with its positive terminal 4 connected to an adjustable reference threshold voltage and with its negative terminal 5 coupled to the negative terminal B of the power supply so as to detect the arc voltage. The wiper arm 55 of variable resistor R8 is adjusted such that the output 66 of comparator IC4 goes low when the arc voltage drops below 250 volts representing the existence of an arc A between the torch electrode and workpiece W. When the output 66 goes low, the base 68 of transistor Q2 goes low turning off transistor Q2 which in turn applies a logical high to the common input terminals 69 of nand gate IC5. This causes the output terminal 71 of IC5 to go low which applies a negative going pulse to input terminal 72 of nand gate IC6 switching the output 74 to a logical high. The output 74 of nand gate IC6 is applied simultaneously to the common input terminals 75 of nand gate IC7 and to the input pin 52 of nand gate IC2. A high now appears on both input pins 51 and 52 of nand gate IC2 and its output 53 switches back to a logical low. When the output 53 goes low a negative pulse is applied to pin 77 of the timing circuit 78 which is a conventional integrated timing circuit such as MC 1455 from Motorola Semiconductor Products Inc. The negative pulse on pin 77 enables the timing circuit 78 which generate a logical high output on terminal 80 for a predetermined period of time. The logical high on terminal 80 is applied through resistor R2 to the base 54 of transistor Q1 for maintaining transistor Q1 in the "on" state even though the output 53 of nand gate IC2 has switched back to a logical low. Upon termination of the timing period terminal 80 goes low and transistor Q1 turns off deenergizing LED 1 and in turn disabling SCR's 32, 34 and 36 of the bridge circuit 22.

When the logical high output 74 is applied in common to the input terminals 75 of nand gate IC7, the output 82 of nand gate IC7 goes low turning off transistor Q3 in the slope control circuit 44. This allows capacitor C2 to charge through resistor R5 which increases the voltage on the base 84 of transistor Q4. Transistor Q4 is coupled as an emitter follower to transistor Q5 which in turn provides a voltage at its emitter 85 proportional to the rise in voltage across capacitor C2 until the breakdown voltage of zenor diode ZD1 is reached. Upon reaching the breakdown voltage of zenor diode ZD2 the base 86 of transistor 25 is clamped to the breakdown voltage and will rise no further. This places a corresponding maximum voltage at terminal 85 which is applied through resistor R6 to the main bridge firing control circuit 30 as the ramp input signal 45 as discussed heretofore.

What is claimed is:

1. A constant current SCR welding power supply in which current is supplied through SCR rectifier means to a welding load including an electrode to workpiece comprising:
   a transformer having a primary winding adapted to be connected to a source of AC line voltage and a first and second secondary winding;
   first DC power supply output means for providing across said welding load a high open circuit voltage at relatively low current, said first DC power output means including a first bridge rectifier having first SCR circuit means connected to said first secondary winding and first firing means for energizing said first SCR circuit means during each cycle of applied line voltage;
   second DC power output means for providing an arc working voltage across said output welding load, said second DC power output means including a second bridge rectifier having second SCR circuit means connected to said second secondary winding of said transformer and second firing means for energizing said second SCR circuit means in synchronism with each cycle of applied line voltage;
   constant current control means for controlling said second firing means so as to maintain a constant welding current;
   detection means responsive to the presence of an arc across the welding load for disabling said second DC power supply output means until said arc is detected;
   slope control means responsive to said detection means for applying a varying input signal to said constant current control means such that the current supplied by said second DC power output means is controllably increased from the detection of said arc at a predetermined rate until a predetermined level is reached; and
   time delay means responsive to said detection means for disabling said first DC power supply output means after a predetermined time period following detection of an arc.

2. A constant current welding power supply as defined in claim 1 wherein said source of AC line voltage is a three phase source and wherein said first and second bridge rectifier circuits are full wave bridge rectifier circuits.

3. A constant current SCR welding power supply as defined in claim 1 or 2 wherein said slope control means comprises a ramp generator providing an output signal which varies from a first level to a second level at a predetermined slope.

4. A constant current SCR welding power supply as defined in claim 3 wherein said second firing means is controlled in response to the output signal of said ramp generator such that said second SCR circuit means is energized during each cycle of applied line voltage at a time proportional to the magnitude of the output signal.

* * * * *